(12) United States Patent
Mine et al.

(10) Patent No.: US 12,377,800 B2
(45) Date of Patent: Aug. 5, 2025

(54) WIRE HARNESS FOR SLIDING DOOR

(71) Applicants: TOYOTA JIDOSHA KABUSHIKI KAISHA, Aichi-ken (JP); Sumitomo Wiring Systems, Ltd., Mie (JP)

(72) Inventors: Yoshihiko Mine, Nagoya (JP); Mitsuhiro Katoh, Miyoshi (JP); Hiroki Tsutsumi, Chiryu (JP); Hiroki Uno, Yokkaichi (JP); Go Ueno, Yokkaichi (JP); Kazuya Takahashi, Yokkaichi (JP)

(73) Assignees: TOYOTA JIDOSHA KABUSHIKI KAISHA, Aichi-Ken (JP); SUMITOMO WIRING SYSTEMS, LTD., Mie (JP)

( * ) Notice: Subject to any disclaimer, the term of this patent is extended or adjusted under 35 U.S.C. 154(b) by 210 days.

(21) Appl. No.: 18/451,102

(22) Filed: Aug. 17, 2023

(65) Prior Publication Data

US 2024/0101050 A1 Mar. 28, 2024

(30) Foreign Application Priority Data

Sep. 26, 2022 (JP) ................................. 2022-152280

(51) Int. Cl.
| | | |
|---|---|---|
| B60R 16/02 | (2006.01) | |
| H02G 3/04 | (2006.01) | |
| H02G 11/00 | (2006.01) | |
| H01B 7/00 | (2006.01) | |

(52) U.S. Cl.
CPC ........... *B60R 16/0215* (2013.01); *H02G 3/04* (2013.01); *H02G 11/00* (2013.01); *H01B 7/0045* (2013.01)

(58) Field of Classification Search
CPC ..... B60R 16/0215; H02G 3/04; H01B 7/0045
See application file for complete search history.

(56) References Cited

U.S. PATENT DOCUMENTS

2024/0317157 A1* 9/2024 Kogure .................. H02G 11/00

FOREIGN PATENT DOCUMENTS

JP 2001-260770 A 9/2001

* cited by examiner

*Primary Examiner* — Paresh Paghadal
(74) *Attorney, Agent, or Firm* — HAUPTMAN HAM, LLP

(57) ABSTRACT

A wire harness is arranged between a vehicle body and a sliding door in a vehicle, in which: a protector is mounted on a bent region of the wire harness having a shape in which a middle of the wire harness in a longitudinal direction is bent in a crank shape; the protector includes a groove having a shape corresponding to the bent shape of the wire harness and has a larger width than a radial size of the wire harness; a bottom surface of the groove has a hole into which a pin is detachably inserted, the pin constraining the wire harness in a state where the wire harness has looseness so as not to contact an inner angle portion at a bent site of the groove; and one side of the bent region of the wire harness is fixed to the protector using a fastening member.

1 Claim, 2 Drawing Sheets

WIRE HARNESS FOR SLIDING DOOR

CROSS-REFERENCE TO RELATED APPLICATION

This application claims priority to Japanese Patent Application No. 2022-152280 filed on Sep. 26, 2022, incorporated herein by reference in its entirety.

BACKGROUND

1. Technical Field

The present disclosure relates to a wire harness for a sliding door in a vehicle or the like.

2. Description of Related Art

In a vehicle including a sliding door, when a wire harness for supplying electric power to various electric components (for example, a power window, an automatic lock, and the like) mounted in the sliding door is installed by being bent along an installation path that is bent at 90 degrees, the wire harness sometimes comes into contact with an inner angle portion at the bent portion of the installation path, and therefore the length of a section that is of the wire harness and that passes through the bent portion of the installation path is likely to be short.

In such a routing state of the wire harness, with the opening and closing of the sliding door, the wire harness is pushed and pulled while being twisted at the bent portion of the installation path. Therefore, there is a concern that the motion of the wire harness gets worse and the bending durability of the wire harness decreases.

In response, for example, Japanese Unexamined Patent Application Publication No. 2001-260770 (JP 2001-260770 A) discloses a structure in which the wire harness is arranged between a vehicle body and the sliding door by first and second link pieces of a link member.

One end side of the first link piece and one end side of the second link piece are coupled in a swingable manner, and the other end side of the first link is provided with first and second stoppers for restricting the swing amount between the first link piece and the second link piece within a certain range.

When the sliding door is opened and closed, the first link piece and the second link piece are swung while being restricted within an adequate range by the first and second stoppers, and thereby the wire harness is moved so as not to interfere with the sliding door.

SUMMARY

In JP 2001-260770 A, the number of components for guiding the wire harness is large, and therefore, there is a concern of increase in cost.

In view of such a circumstance, the present disclosure has an object to provide a wire harness for a sliding door that restrains cost rise while achieving a smooth opening-closing action of the sliding door.

The present disclosure is a wire harness that is arranged between a vehicle body and a sliding door in a vehicle, in which: a protector is mounted on a bent region of the wire harness having a shape in which a middle of the wire harness in a longitudinal direction of the wire harness is bent in a crank shape; the protector is provided with a groove that is formed in a shape corresponding to the bent shape of the wire harness and that is set so as to have a larger width than a radial size of the wire harness; a bottom surface of the groove is provided with a hole into which a pin is detachably inserted, the pin being a pin by which the wire harness is constrained in a state where the wire harness has looseness in the longitudinal direction so as not to come into contact with an inner angle portion at a bent site of the groove; and one side of the bent region of the wire harness is fixed to the protector using a fastening member.

In this configuration, when the protector is mounted on the wire harness and the pin is inserted into the hole of the protector, the wire harness is constrained in the state where the wire harness has looseness in the longitudinal direction so as not to come into contact with the inner angle portion at the bent site of the groove.

In this way, only the protector and the pin are used for constraining the posture of the wire harness, and therefore the number of components is smaller compared to conventional examples, so that the rise in cost can be restrained.

Moreover, when the pin is detached from the hole in the state where the wire harness is constrained, the wire harness is kept in the state where the wire harness is loosened in the longitudinal direction in the groove. Therefore, although the wire harness is pushed and pulled while being twisted with the opening and closing of the sliding door, the wire harness is avoided from being stretched in the groove on that occasion, and the wire harness is unlikely to come into contact with the inner angle portion at the bent site of the groove.

Thereby, the motion of the wire harness becomes smooth, and the bending durability of the wire harness is enhanced.

With the present disclosure, it is possible to provide a wire harness for a sliding door that restrains cost rise while achieving a smooth opening-closing action of the sliding door.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

The best mode for carrying out the present disclosure will be described below in detail with reference to the accompanying drawings.

Figure 1:
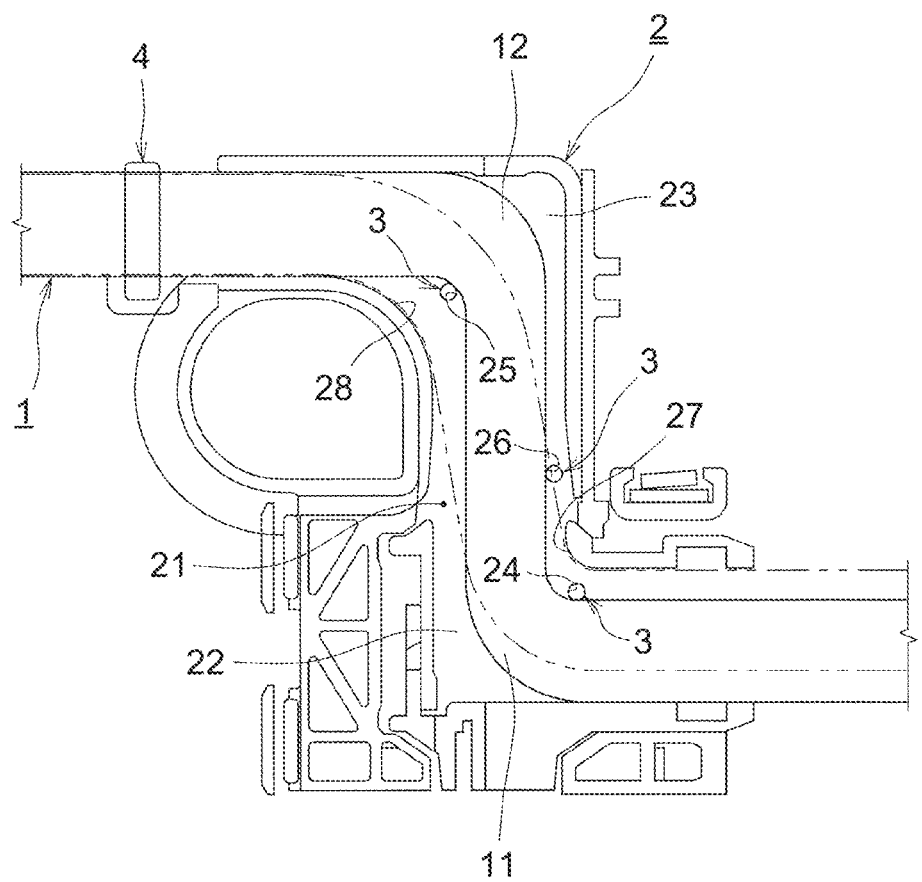
FIG. 1 is a diagram showing an embodiment of a wire harness for a sliding door according to the present disclosure.
Figure 2:
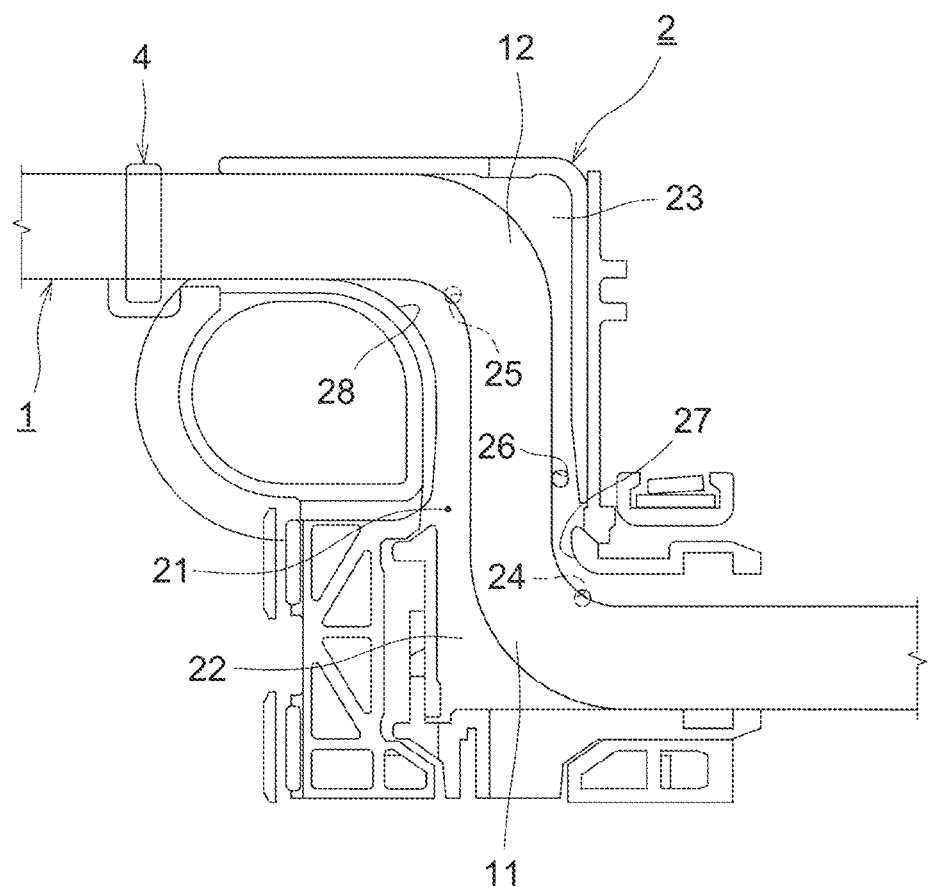
FIG. 2 is a diagram showing a state where pins are detached from holes of a protector.

FIG. 1 and FIG. 2 show an embodiment of the present disclosure. In the figures, reference numeral 1 denotes a wire harness.

Although not illustrated, the wire harness 1 is arranged between a vehicle body and a sliding door in a vehicle.

For example, as shown in FIG. 1, the wire harness 1 is in a posture in which a middle of the wire harness 1 in the longitudinal direction of the wire harness 1 is bent in a crank shape, so that two (first and second) bent regions 11, 12 are provided. The bending angles of the first and second bent regions 11, 12 each are set to 90 degrees.

A protector 2 is mounted on the first and second bent regions 11, 12 of the wire harness 1. One end side of the second bent region 12 of the wire harness 1 is fixed to the protector 2, using a fastening member (for example, a binding band) 4.

The protector 2 is provided with a groove 21 into which the wire harness 1 is put with a gap. For this state, at least the width size of the groove 21 is set so as to be larger than the radial size of the wire harness 1.

The groove 21 is bent in a crank shape, so that two (first and second) bent sites 22, 23 are provided. The bending angles of the first and second bent sites 22, 23 each are set to 90 degrees.

A bottom surface of the groove 21 is provided with first, second, and third holes 24, 25, 26 into each of which a pin 3 for constraining the wire harness 1 in the bent shape is inserted.

In a state where the pins 3 are inserted into the first to third holes 24 to 26, the wire harness 1 is constrained in a state where the wire harness 1 has looseness in the longitudinal direction so as not to come into contact with inner angle portions 27, 28 at the first and second bent sites 22, 23 of the groove 21.

An example of places where the first to third holes 24 to 26 are provided will be described. First, the first hole 24 is provided near the inner angle portion 27 at the first bent site 22 of the groove 21. Further, the second hole 25 is provided near the inner angle portion 28 at the second bent site 23 of the groove 21. Furthermore, the third hole 26 is provided on a way from the inner angle portion 27 of the first bent site 22 to an outer angle portion (no reference numeral) of the second bent site 23.

Next, a procedure and manner in which the protector 2 is mounted on the wire harness 1 will be described with reference to FIG. 2.

First, the protect 2 is placed on an unillustrated jig table, and one end side of the second bent region 12 of the wire harness 1 previously bent in the crank shape is fixed to the protector 2, using the fastening member 4. Then, the wire harness 1 is put into the groove 21 of the protector 2.

Thereafter, as shown in FIG. 1, the respective pins 3 are inserted into the first and second holes 24, 25 along inner curved surfaces at the first and second bent regions 11, 12 of the wire harness 1, such that the first and second bent regions 11, 12 of the wire harness 1 do not come into contact with the inner angle portions 27, 28 at the first and second bent sites 22, 23 of the groove 21, and the pin 3 is inserted into the third hole 26 along a middle of a straight region from the inner curved surface of the first bent region 11 of the wire harness 1 to an outer curved surface of the second bent region 12. On this occasion, the pins 3 are inserted into the jig table also, so that the protector 2 is fixed to the jig table.

Thereby, the wire harness 1 is constrained in the state where the wire harness 1 has looseness in the longitudinal direction so as not to come into contact with the inner angle portions 27, 28 at the first and second bent sites 22, 23 of the groove 21.

Thereafter, the three pins 3 are detached from the first to third holes 24 to 26, and the protector 2 is separated from the jig table.

Generally, once the wire harness 1 is bent, the wire harness 1 is placed into a state where the bent posture is kept (plastic deformation), because of the property of an internal core wire (for example, a soft metal such as gold or copper) of the wire harness 1. Therefore, even when the pins 3 are detached, the wire harness 1 is kept in the posture in which the wire harness 1 is constrained by the three pins 3.

Although not illustrated, when the sliding door is opened and closed in a state where the wire harness 1 on which protector 2 is mounted is attached to an opening portion for attaching the sliding door to the vehicle body, the wire harness 1 is pushed and pulled while being twisted. However, on that occasion, since the wire harness 1 is kept in the above posture, the wire harness 1 is avoided from being stretched in the groove 21 as shown by two-dot chain lines in FIG. 1. Further, the wire harness 1 is unlikely to interfere with the inner angle portions 27, 28 at the first and second bent sites 22, 23 of the groove 21, and even when the wire harness 1 interferes, a weak contact is merely performed.

However, in the case where the wire harness 1 is not placed into the state where the wire harness 1 has looseness in the longitudinal direction by the pins 3, the wire harness 1 is stretched in the groove 21, and interferes with the inner angle portions 27, 28 at the first and second bent sites 22, 23 of the groove 21, as shown by the two-dot chain lines in FIG. 1. Therefore, with the opening and closing of the sliding door, the wire harness 1 strongly comes into contact with the inner angle portions 27, 28 at the first and second bent sites 22, 23 of the protector 2. As a result, the motion of the wire harness 1 gets worse, and the bending durability decreases.

As described above, in the embodiment to which the present disclosure is applied, the wire harness 1 is put in the state where the wire harness 1 has looseness in the longitudinal direction so as not to come into contact with the inner angle portions 27, 28 at the first and second bent sites 22, 23 of the groove 21 of the protector 2, and therefore the opening-closing action of the sliding door becomes smooth, and the bending durability of the wire harness 1 is enhanced.

Moreover, only the protector 2 and the pins 3 are used for constraining the posture of the wire harness 1, and therefore the number of components is smaller compared to conventional examples, so that the rise in cost can be restrained.

The present disclosure is not limited to the above embodiment, and can be appropriately modified within the scope of the claims and within a scope equivalent to the scope of the claims. In the above embodiment, for example, the number of pins 3 that are used may be two, or four or more, and the number of bent regions of the wire harness 1 may be one, or three or more.

The present disclosure can be suitably used for a wire harness for a sliding door.

What is claimed is:

1. A wire harness for a sliding door, the wire harness being arranged between a vehicle body and the sliding door in a vehicle, wherein:
   a protector is mounted on a bent region of the wire harness having a shape in which a middle of the wire harness in a longitudinal direction of the wire harness is bent in a crank shape;
   the protector is provided with a groove that is formed in a shape corresponding to the bent shape of the wire harness and that is set so as to have a larger width than a radial size of the wire harness;
   a bottom surface of the groove is provided with a hole into which a pin is detachably inserted, the pin being a pin by which the wire harness is constrained in a state where the wire harness has looseness in the longitudinal direction so as not to come into contact with an inner angle portion at a bent site of the groove; and
   one side of the bent region of the wire harness is fixed to the protector using a fastening member.

\* \* \* \* \*